(12) United States Patent
Jha et al.

(10) Patent No.: US 11,884,419 B2
(45) Date of Patent: Jan. 30, 2024

(54) EXTERIOR AIRCRAFT LIGHT AND AIRCRAFT COMPRISING AN EXTERIOR AIRCRAFT LIGHT

(71) Applicant: Goodrich Lighting Systems GmbH & Co. KG, Lippstadt (DE)

(72) Inventors: Anil Kumar Jha, Lippstadt (DE); Robert Trinschek, Hamm (DE); Jens Leuschner, Möhnesee (DE); John D. Edquist, Milwaukee, WI (US)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/669,603

(22) Filed: Feb. 11, 2022

(65) Prior Publication Data
US 2022/0258881 A1 Aug. 18, 2022

(30) Foreign Application Priority Data
Feb. 12, 2021 (EP) ..................................... 21156873

(51) Int. Cl.
*B64D 47/06* (2006.01)
*F21V 23/06* (2006.01)
*B64D 47/08* (2006.01)

(52) U.S. Cl.
CPC .............. *B64D 47/06* (2013.01); *F21V 23/06* (2013.01); *B64D 47/08* (2013.01)

(58) Field of Classification Search
CPC .... B64D 2203/00; B64D 47/02; B64D 47/06; B64D 47/08; F21W 2107/30; F21V 23/06
See application file for complete search history.

(56) References Cited

U.S. PATENT DOCUMENTS 5,446,277 A * 8/1995 Rutter ....................... G01J 1/42
                                                              250/214 R
6,191,541 B1 2/2001 Patel et al.
(Continued)

FOREIGN PATENT DOCUMENTS

| EP | 2502828 B1 | 1/2016 |
| EP | 3454087 A1 | 3/2019 |
| WO | 0027699 | 5/2000 |

OTHER PUBLICATIONS

EP 2502828B1 (Abstract of EP 2502828A1).
Extended European Search Report for International Application No. 21156873.8 dated Jul. 19, 2021, 5 pages.

*Primary Examiner* — William J Carter
(74) *Attorney, Agent, or Firm* — CANTOR COLBURN LLP (57) ABSTRACT

An exterior aircraft light that can be used on an aircraft includes a dome-shaped light transmissive cover, a light emission assembly, and an interface assembly. The light emission assembly comprises a light emission tower portion, having a cover-facing end and an opposite aircraft-facing end and having a hollow channel extending between the aircraft-facing end and the cover-facing end, a platform portion, and at least one light source and at least one optical element, arranged on the platform portion. The interface assembly extends through the hollow channel of the light emission tower portion and comprises an elevated base, which is configured for mechanically supporting and electrically connecting an electric component, the electric component being at least one of a data reception component, a data transmission component, and a data generation component. The interface assembly further comprises at least one signal line, which extends from the elevated base through the interface assembly.

19 Claims, 7 Drawing Sheets

(56) References Cited

U.S. PATENT DOCUMENTS

| | | | |
|---|---|---|---|
| 8,970,423 B2* | 3/2015 | Kabrt | G01S 13/87 |
| | | | 342/52 |
| 10,156,627 B2* | 12/2018 | Beard | G01S 5/0072 |
| 10,794,835 B2* | 10/2020 | Fan | B64D 15/20 |
| D901,369 S | 11/2020 | Lachica | |
| 2010/0027281 A1 | 2/2010 | Waters et al. | |

* cited by examiner

EXTERIOR AIRCRAFT LIGHT AND AIRCRAFT COMPRISING AN EXTERIOR AIRCRAFT LIGHT

CROSS-REFERENCE TO RELATED APPLICATIONS

This application claims priority to European Patent Application No. 21156873.8 filed Feb. 12, 2021, the entire contents of which is incorporated herein by reference.

TECHNICAL FIELD

The present invention relates to exterior aircraft lighting. In particular, it relates to an exterior aircraft light, such as an aircraft beacon light, an aircraft position light, or an aircraft anti-collision light, and to an aircraft equipped with at least one of such lights.

BACKGROUND

Aircraft comprise electric components, such as antennas, which may be located outside the aircraft. Such exterior electric components may be electrically connected to circuitry within the aircraft. Openings within the outer skin of the aircraft need to be provided, in order to allow for electric connections between the electrical components, located on the exterior of the aircraft, and the circuitry within the aircraft. Such openings reduce the strength and rigidity of the aircraft structure and increase manufacturing costs of the aircraft. Further, components protruding from the aircraft generate additional aerodynamic drag, causing increased fuel consumption of the aircraft.

Accordingly, it would be beneficial to improve the installation of electric components, such as antennas, on the outside of an aircraft, in order to avoid or at least reduce the above mentioned drawbacks.

SUMMARY

Exemplary embodiments of the invention include an exterior aircraft light comprising a dome-shaped light transmissive cover, a light emission assembly, and an interface assembly. The light emission assembly comprises a tower portion and a platform portion. At least one light source and at least one optical element are arranged on the platform portion. The tower portion has a cover-facing end and an opposite aircraft-facing end. A hollow channel extends between the aircraft-facing end and the cover-facing end. The interface assembly extends through the hollow channel of the tower portion and comprises an elevated base configured for mechanically supporting and electrically connecting an electric component, which is at least one of a data reception component, a data transmission component, and a data generation component. The interface assembly further comprises at least one signal line, which extends from the elevated base through the interface assembly.

The exterior aircraft light comprises a dome-shaped light transmissive cover. The dome-shaped light transmissive cover may be a generally rounded structure, such as a substantially semi-spherical structure, a structure substantially shaped as a half tear drop or another suitable rounded structure. It is also possible that the dome-shaped light transmissive cover is not fully rounded, but comprises edges at its outer shape. For example, the dome-shaped light transmissive cover may have a cup shape, with the side wall of the cup being substantially cylindrical or conical. The top/floor of the cup may be a substantially planar surface. It is also possible that the dome-shaped light transmissive cover has a pointed top. It is further possible that the dome-shaped light transmissive cover has a polygonal outer side wall. The dome-shaped light transmissive cover may also be shaped like a tube or a portion of a tube, such as a half-tube including a curved roof portion which extends between two flat side portions.

Exemplary embodiments of the invention further include an aircraft comprising at least one exterior aircraft light according to an exemplary embodiment of the invention. The aircraft may be an air plane or a helicopter.

Exemplary embodiments of the invention allow for integrating an electric component, such as a data reception component, a data transmission component, and a data generation component, which is purposefully located outside the aircraft for providing its desired functionality, into an exterior aircraft light, protruding from the outer surface of the aircraft.

When an exterior aircraft light according to an exemplary embodiment of the invention is employed, no additional openings need to be formed within the outer skin of the aircraft for electrically connecting the electric component with circuitry inside the aircraft. As compared to providing dedicated openings in the outer skin of the aircraft for the electric component, the stability of the aircraft structure is enhanced, and the manufacturing costs may be reduced. Further, as the number of protrusions, extending from the outer surface of the aircraft, may be reduced, the aerodynamics of the aircraft may be improved, which results in a reduction of the fuel consumption of the aircraft. According to exemplary embodiments of the invention, the electric component may be arranged within the exterior aircraft light, i.e. inside the cover of the exterior aircraft light, which results in the electric component being protected by the cover from adverse environmental influences, such as water, moisture, dirt and mechanical impact. In consequence, there is no need for providing extra protection for the electric component. This may allow for reducing the manufacturing complexity and manufacturing costs even further.

According to an embodiment, the platform portion is located at or close to the cover-facing end of the tower portion. The platform portion may in particular be located within a distance of not more than 5 mm, more particularly within a distance of not more than 3 mm from the cover-facing end of the tower portion. As a result, the platform portion is spaced from the outer skin of the aircraft. Such a configuration may help in providing a good spatial distribution of light, emitted by the exterior aircraft light, as it may reduce the amount of light emitted by the exterior aircraft light and blocked by the aircraft, in particular by the fuselage of the aircraft.

According to an embodiment, the domed-shaped light transmissive cover has a convex shape, protruding from the outer skin of the aircraft and defining, in combination with the outer skin of the aircraft, an interior space of the exterior aircraft light, which is shielded from adverse environmental influences by the cover. This allows for installing sensitive electric components within the aircraft light, without providing additional protection. It further allows for arranging electric components in some distance from the outer skin of the aircraft, which might by beneficial for improving the functionality of the respective electric components. For example, the transmission properties of an antenna may be improved by arranging the antenna in some distance from the outer skin of the aircraft, as it reduces the electromagnetic shielding caused by the aircraft.

According to an embodiment, the light emission assembly and/or the interface assembly protrude from the outer skin of the aircraft at an angle of between 70° and 90°, in particular at an angle of between 80° and 90°, further in particular at an angle of about 90°, with respect to the outer skin of the aircraft. Such large angles may allow for providing a large distance between the outer skin of the aircraft and the outer ends of the light emission assembly and/or the interface assembly, i.e. the ends of the light emission assembly and/or the interface assembly facing away from the aircraft, when the exterior aircraft light is mounted to the aircraft. In this way, above described effect of spacing the platform portion of the light emission assembly and/or the elevated base of the interface assembly from the outer skin of the aircraft may be achieved in a particularly convenient manner.

According to an embodiment, the light emission assembly extends up to a first distance from the outer skin of the aircraft into the interior space and the elevated base is located at a second distance, which is larger than the first distance, from the outer skin of the aircraft. Arranging the elevated base and the one or more electric components, supported by the elevated base, at a distance which is larger than the distance between outer end of the light emission assembly and the outer skin of the aircraft, may prevent the electric component from being shielded by the light emission assembly. Shielding the electric component could deteriorate its functionality.

According to an embodiment, the elevated base comprises a planar surface, which is configured for accommodating the electric component.

According to an embodiment, the elevated base comprises at least one electric contact which is configured for electrically connecting with a corresponding electric contact provided at the electric component, which is supported by the elevated base. Corresponding electric contacts, formed at the elevated base and the electric component, provided for a simple and reliable means for electrically connecting an electric component, which is supported by the elevated base.

According to an embodiment, the interface assembly comprises at least one mechanical fastener, which is configured for fixing an electric component, supported by the elevated base, to the interface assembly. The at least one mechanical fastener allows for mechanically fixing the electric component to the interface assembly, in order to hold the electric component reliably in the correct position, even when the aircraft is operated and subject to vibrations and other mechanical forces.

According to an embodiment, the platform portion supports at least one of or any subset of one or more reflectors, one or more lenses, and one or more shutters. In other words, the at least one optical element, arranged on the platform portion, may comprise one or more reflectors and/or one or more lenses and/or one or more shutters. Further, the platform portion may support a circuit board, in particular a printed circuit board, to which the at least one light source is attached. The one or more light sources and the one or more optical elements may jointly generate a desired light output of the exterior aircraft light, when the at least one light source is operated.

According to an embodiment, the at least one light source comprises or includes at least one LED. The exterior aircraft light may in particular include a plurality of light sources, in particular a plurality of LEDs.

According to an embodiment, all light sources may be configured for emitting light having the same color, in particular red or white light. In a particular embodiment, the light sources may be red or white light sources.

According to another embodiment, the exterior aircraft light may comprise different types of light sources, which are configured for emitting light of different colors.

According to an embodiment, the exterior aircraft light comprises first and second connectors, which are configured for protruding from an aircraft side of the exterior aircraft light into the aircraft. The aircraft side of the exterior aircraft side is opposite to the light transmissive cover. The first and second connectors may be configured for connecting the exterior aircraft light to an aircraft power supply and communication system. The first connector is electrically coupled to the interface assembly, in particular to the at least one signal line of the interface assembly, for electrically connecting with an electric component, supported by the elevated base, and the second connector is electrically coupled to the light emission assembly for supplying electric power to the at least one light source.

According to an embodiment, the first connector is arranged in a central portion of the interface assembly and/or in a central portion of the light emission assembly, and the second connector is offset from the central portion of the light emission assembly. Such a configuration may allow for minimizing the length of the at least one signal line, electrically connecting the first connector with the electric component. Also, such a configuration may allow for the interface assembly to be insertable into and removable from the hollow channel of the tower portion of the light emission assembly, without interfering with the second connector.

According to a further embodiment, the interface assembly is insertable into the tower portion of the light emission assembly, i.e. it can be slid into the tower portion of the light emission assembly. Also, the interface assembly may be removable from the tower portion of the light emission assembly, i.e. it can be slid out of the tower portion of the light emission assembly. In this way, the interface assembly, carrying a data reception component and/or a data transmission component and/or a data generation component, can be integrated with the exterior aircraft light at various points in time during the manufacture of the aircraft. A highly flexible, highly integrated lighting and communication/data acquisition device may be provided. Also, the interface assembly and the electric component, supported by the interface assembly, may be maintained and/or upgraded, without having to uninstall the exterior aircraft light from the aircraft.

According to an embodiment, at least one opening is formed in the dome-shaped light transmissive cover, in order to allow a portion an electric component, supported by the elevated base, to extend through the cover out of the interior space of the exterior aircraft light. Arranging a portion of an electric component outside the interior space of the exterior aircraft light may enhance the functionality of the electric component.

According to an embodiment, the exterior aircraft light further comprises a gasket for sealing an interface between the light transmissive cover and the portion of the electric component extending through the cover. The gasket may prevent water, moisture and dirt from entering into the interior space of the exterior aircraft light via the opening. In the case of multiple openings, each opening may be provided with a gasket.

According to an embodiment, the exterior aircraft light is at least one of a position light, also referred to as navigation light, indicating the current position of the aircraft, a white strobe anti-collision light, and a red-flashing beacon light. The expression of the exterior aircraft light being at least one of a position light, a white strobe anti-collision light, and a red-flashing beacon light means that the exterior aircraft light has the functionality of at least one of a position light, a white strobe anti-collision light, and a red-flashing beacon light. The exterior aircraft light may in particular be a fuselage-mounted red-flashing beacon light. The exterior aircraft light may also be a wing-tip-mounted or tail-mounted position light and/or white strobe anti-collision light.

An aircraft in accordance with an embodiment of the invention may have two red-flashing beacon lights, arranged on the top of the aircraft fuselage and on the bottom of the aircraft fuselage, respectively. The red flashes may indicate that the engines of the aircraft are turned on.

According to an embodiment, the exterior aircraft light further comprises an electric component, which is supported by the elevated base and in electric contact with the first electric connector, in particular via the at least one signal line. The electric component may be a data reception component or a data transmission component or a data generation component or a multi-functional electric component, having at least two of data reception functionality, data transmission functionality, and data generation functionality.

According to an embodiment, the electric component is at least one of a data reception component, such as a receiving antenna, a data transmission component, such as a sending antenna, and a data generation component, such as sensor and/or a camera. The sensor and/or the camera may be configured for sensing visible light and/or infrared light. The sensor may also be one of a radar sensor, a temperature sensor, a barometric pressure sensor and a wind sensor. The antenna may also be used both for receiving communications and transmitting communications and may thus act as a joint data reception and data transmission component.

BRIEF DESCRIPTION OF THE DRAWINGS

Further exemplary embodiments of the invention are described below with respect to the accompanying drawings, wherein.

DETAILED DESCRIPTION

Figure 1:
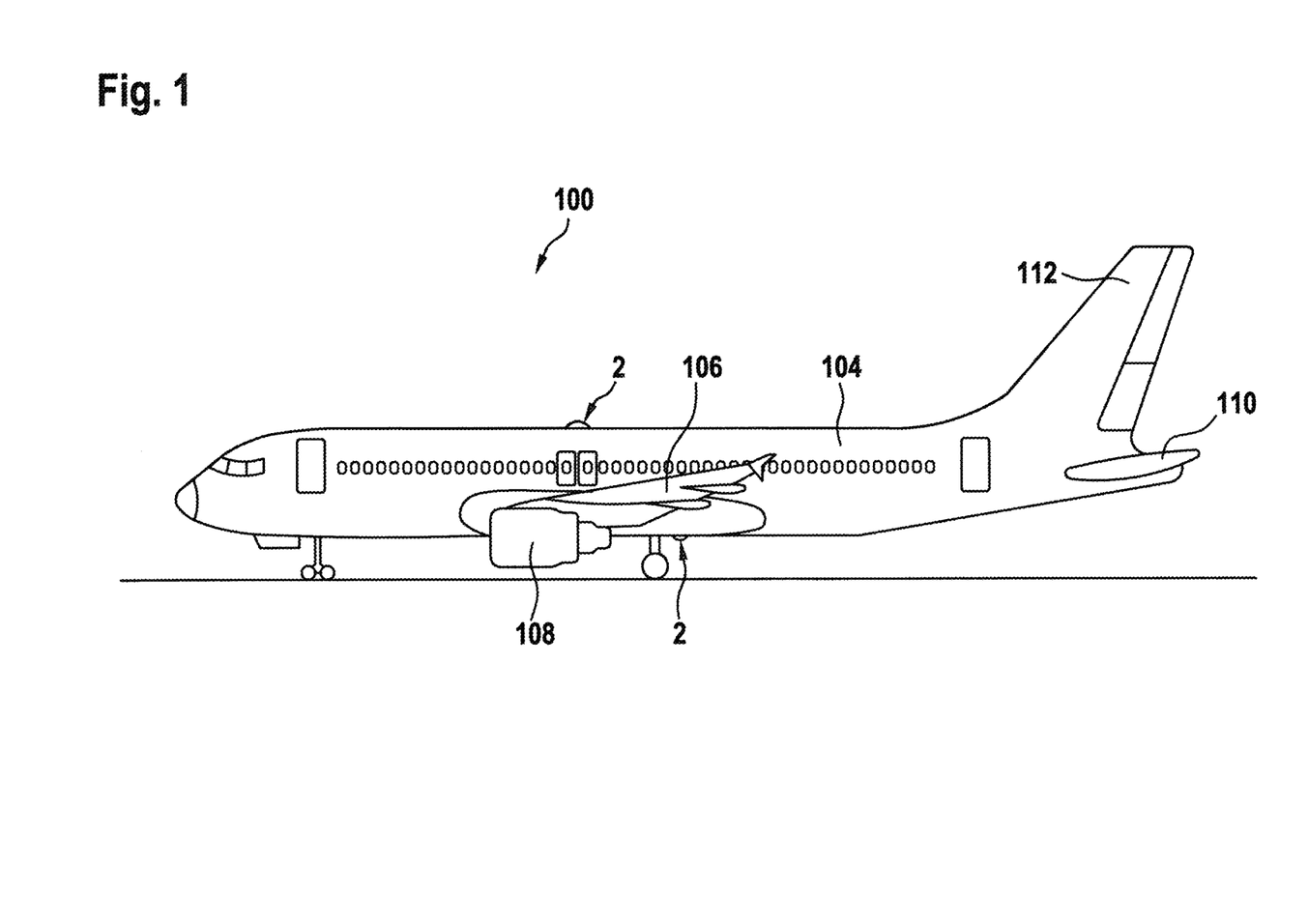
FIG. 1 depicts a schematic side view of an aircraft in accordance with an exemplary embodiment of the invention, which is equipped with two exterior aircraft lights according to exemplary embodiments of the invention.

FIG. 1 depicts a schematic side view of an aircraft 100 in accordance with an exemplary embodiment of the invention, which is equipped with two exterior aircraft lights 2 according to exemplary embodiments of the invention. The aircraft 100 of FIG. 1 is an air plane, in particular a large commercial passenger or cargo air plane. It is pointed out that other types of aircraft, such as smaller air planes and helicopters, may also be equipped with exterior aircraft lights 2 in accordance with exemplary embodiments of the invention.

The aircraft 100 has a fuselage 104 and two wings 106, which are attached to the right and to the left sides of the fuselage 104, respectively. Each of the wings 106 carries an engine 108. Further, two horizontal stabilizers 110 and a vertical stabilizer 112 are mounted to a tail portion of the fuselage 104. In the schematic side view depicted in FIG. 1, only one of the two wings 106, the two engines 108 and the two horizontal stabilizers 110 is visible, respectively. Again, it is pointed out that aircraft in accordance with other designs and constructions are encompassed by exemplary embodiments of the present invention as well.

The aircraft 100 further comprises two exterior aircraft lights 2, mounted to the fuselage 104. An upper exterior aircraft light 2 is mounted to a top portion (roof) of the fuselage 104. A lower exterior aircraft light 2 is mounted to a bottom portion of the fuselage 104. The upper and lower exterior aircraft lights 2 are formed in accordance with exemplary embodiments of the invention, the details of which will be described in more detail below with reference to FIGS. 2 to 9.

The upper and lower exterior aircraft lights 2 may be aircraft beacon lights 2, which emit flashes of red light in operation, in order to provide a beacon light behavior, as it is expected by other aircraft, ground personnel and air space control. In particular, the aircraft beacon lights 2 may emit flashes of aviation red light, with the flashes of aviation red light indicating that the engines 108 of the aircraft 100 are running.

Exterior aircraft lights in accordance with exemplary embodiments of the invention may also be aircraft position lights, continuously emitting white, red or green light, or white strobe anti-collision lights 2, emitting flashes of white light. When embodied as aircraft position lights or white strobe anti-collision lights, the exterior aircraft lights in accordance with exemplary embodiments of the invention may be provided at the wings, in particular the wing tips, and/or at the tail of the aircraft.

Exterior aircraft lights in accordance with exemplary embodiments of the invention may further be combined exterior aircraft lights, providing the combined functionalities of at least two of an aircraft beacon light, an aircraft position light, and an aircraft anti-collision light.

Although only two exterior aircraft lights 2 are shown in FIG. 1, the aircraft 100 may comprise more than two exterior aircraft lights. The aircraft 100 may in particular comprise a combination of aircraft beacon lights, aircraft position lights and aircraft anti-collision lights, and at least some of the exterior aircraft lights may be mounted to the wings 106 and/or to the stabilizers 110, 112 and/or to the tail of the aircraft 100. Not all exterior aircraft lights of the aircraft 100 need to be exterior aircraft lights according to exemplary embodiments of the invention.

Figure 2:
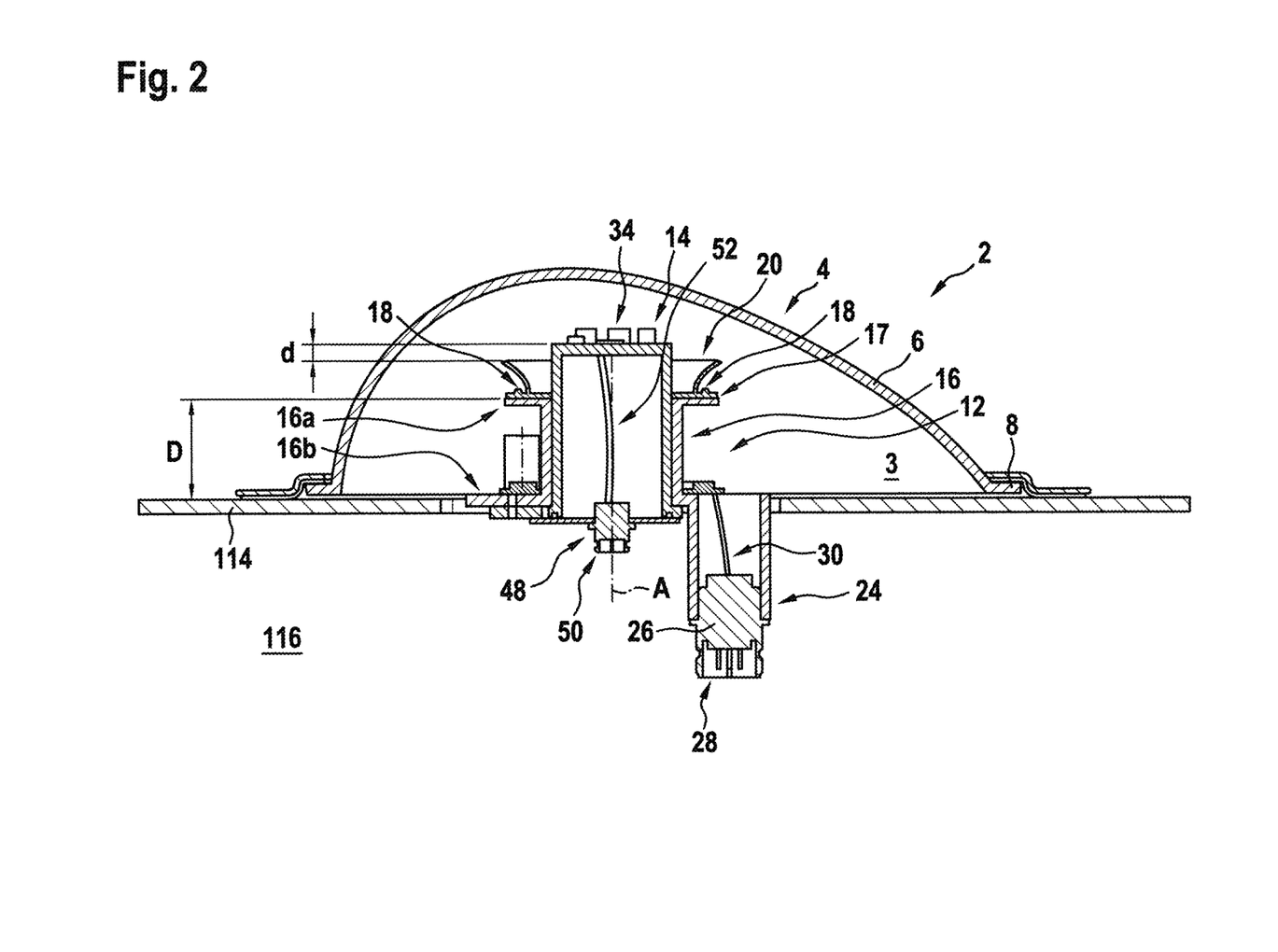
FIG. 2 depicts a cross-sectional side view through an exterior aircraft light according to an exemplary embodiment of the invention.
Figure 3:
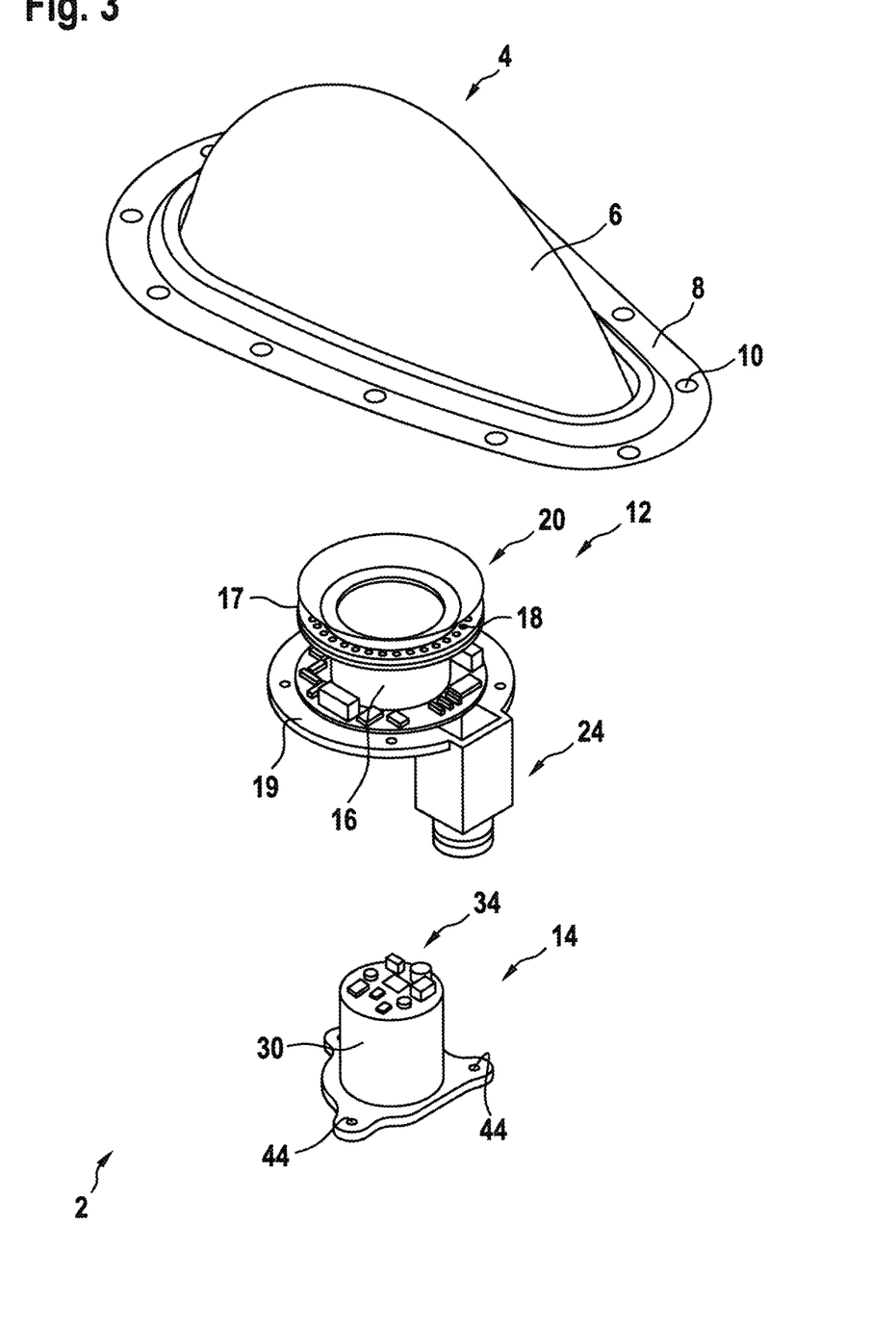
FIG. 3 depicts a perspective exploded view of the exterior aircraft light shown in FIG. 2.

FIG. 2 depicts a cross-sectional side view through an exterior aircraft light 2 according to an exemplary embodiment of the invention, and FIG. 3 depicts a perspective exploded view thereof.

The exterior aircraft light 2 comprises a dome-shaped light transmissive cover 4, which comprises a light transmissive convex portion 6. The convex portion 6 extends from an outer skin 114 of the aircraft 100, when the exterior aircraft light 2 is mounted to an aircraft 100. The convex portion 6 is convex, when looking towards the outer skin 114 of the aircraft 100. The convex portion 6 is surrounded by a frame 8, which is configured for mounting and fixing the light transmissive cover 4 to the outer skin 114 of the aircraft 100. The frame 8 may comprise a plurality of openings 10, which allow fixing means, such as bolts or screws (not shown), to extend through the frame 8 for fixing the light transmissive cover 4 to the outer skin 114 of the aircraft 100. The frame 8 may be light transmissive or may be not light transmissive. The convex portion 6 and the frame 8 may be manufactured as a single piece or may be assembled from original separate parts.

When the exterior aircraft light 2 is mounted to the aircraft 100, as depicted in FIG. 2, the cover 4 and the outer skin 114 define, in combination, an interior space 3 of the exterior aircraft light 2.

The exterior aircraft light 2 further comprises a light emission assembly 12 and an interface assembly 14, which are arranged within the interior space 3 and covered by the cover 4.

When the exterior aircraft light 2 is mounted to the aircraft 100, the light emission assembly 12 and the interface assembly 14 protrude from the outer skin 114 of the aircraft 100 into the interior space 3 of the exterior aircraft light 2. The light emission assembly 12 and an interface assembly 14 in particular protrude at an angle of between 80° and 90°, more particularly at an angle of 90°, with respect the outer skin 114 of the aircraft 100.

Figure 4:
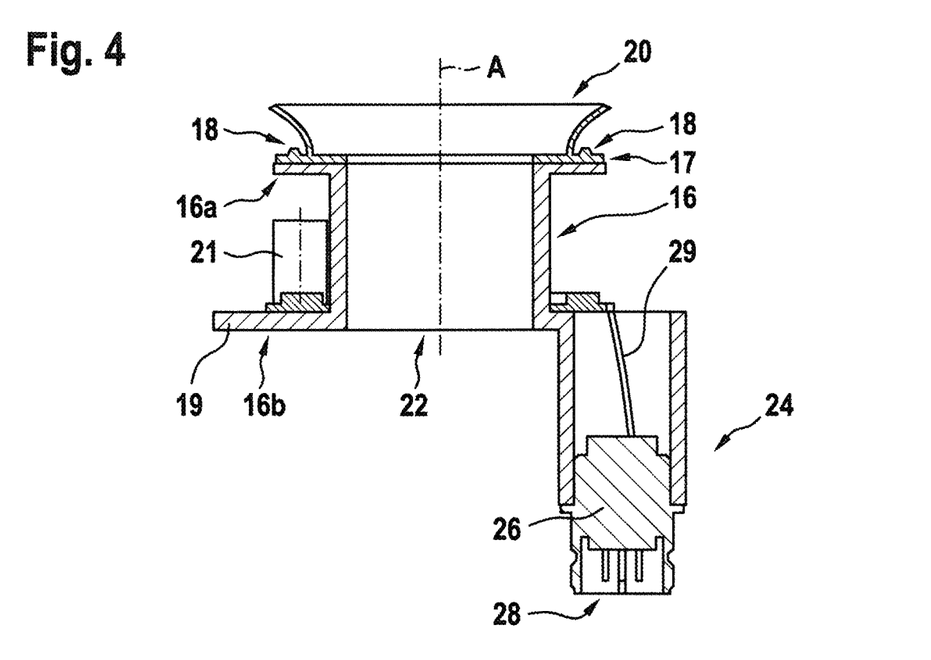
FIG. 4 depicts an enlarged cross-sectional side view of a light emission assembly of the exterior aircraft light shown in FIGS. 2 and 3.
Figure 5:
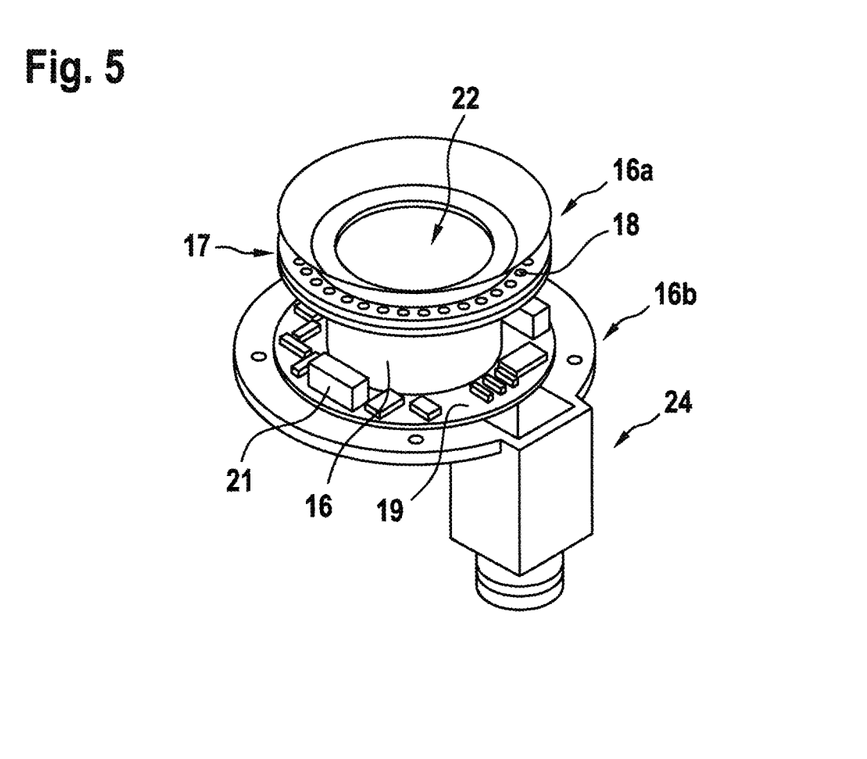
FIG. 5 depicts a perspective view of the light emission assembly shown in FIG. 4.

FIG. 4 depicts an enlarged cross-sectional side view of the light emission assembly 12, as it is employed in an exterior aircraft light 2 according to an exemplary embodiment of the invention, and FIG. 5 depicts a perspective view thereof.

The light emission assembly 12 comprises a tower portion 16, also referred to as light emission assembly tower portion herein, having a first end 16a, which faces the cover 4 when then exterior aircraft light 2 is mounted to the aircraft 100. The first end 16a of the tower portion 16 is therefore also referred to as the cover-facing end 16a.

The tower portion 16 also has a second end 16b opposite to the first end 16b. When then exterior aircraft light 2 is mounted to the aircraft 100, the second end 16b faces the outer skin 114 of the aircraft 100. The second end 16b is therefore also referred to as the aircraft-facing end 16b of the tower portion 16.

A hollow channel 22 extends between the cover-facing end 16a and the aircraft-facing end 16b through the tower portion 16.

The tower portion 16 and the hollow channel 22 may have a cylindrical shape around an axis A, as it is depicted in the figures.

Although not explicitly shown in the figures, the tower portion 16 and the hollow channel 22 may also have different shapes, for example shapes having elliptical or polygonal cross-sections. The tower portion 16 and the hollow channel 22 may also have a tapered, in particular a conical, shape, i.e. a shape in which the diameters of the tower portion 16 and the hollow channel 22 vary along the height of the tower portion 16.

A platform portion 17 is provided next to, in particular at, the cover-facing end 16a of the tower portion 16. The platform portion 17 is located at an elevated position in a distance D from the outer skin 114 of the aircraft 100 (see FIG. 2).

In the embodiment depicted in the figures, the platform portion 17 is provided in the form of a ring, extending around the outer periphery of the cover-facing end 16a of the tower portion 16. The platform portion 17 may be formed integrally with the tower portion 16 or it may be formed as a separate element, which is attached to the tower portion 16.

In alternative embodiments, which are not explicitly depicted in the figures, the platform portion 17 may have different shapes. These shapes may, for example, include arcuate portions (partial ring portions) extending radially outwards from the outer periphery of the tower portion 16, without forming a full ring extending completely around the tower portion 16.

A plurality of light sources 18, in particular a plurality of LEDs 18, and an optical element 20, in particular an annular reflector 20, are arranged on the platform portion 17.

The light, as emitted by the light sources 18 in operation, is transformed by the optical element/reflector 20 into a desired light intensity distribution, providing the desired light output of the exterior aircraft light 2.

In the embodiment depicted in FIG. 5, a plurality of light sources 18 are arranged along the circular platform portion 17 in an equidistant manner. Depending on the desired light distribution to be emitted by the exterior aircraft light 2, other configurations of the light sources 18 are possible as well.

The light sources 18 may emit light of a desired color, in particular red or white. Optionally, different types of light sources 18, which are configured for emitting light of different colors, respectively, may by arranged on the platform portion 17 in order to allow changing the light emitted by the exterior aircraft light 2 by activating the type of light sources 18 emitting the light having the desired color.

In the exemplary embodiment of FIGS. 2 to 5, the exterior aircraft light may in particular be a fuselage-mounted, red-flashing beacon light, and the plurality of light sources 18 may be red light sources, in particular red LEDs.

Additional optical elements, which are not depicted in the figures, such as lenses and/or additional reflectors and/or shutters, may be arranged on the platform portion 17 for forming the desired light intensity distribution of the light output, emitted by the exterior aircraft light 2.

Additional electric and/or electronic elements 21, in particular elements 21 which are employed for operating and controlling the light sources 18 may be arranged on the platform portion 17 and/or on a lower platform 19, which may be formed at the aircraft-facing ("lower") end 16b of the tower portion 16.

The light emission assembly 12 further comprises a light emission assembly connector 24, which extends into an aircraft-facing direction. When seen from the lower platform 19, the light emission assembly connector 24 extends into an opposite direction, as compared to the tower portion 16. In other words, the light emission assembly connector 24 extends into an interior 116 of the aircraft 100, when the exterior aircraft light 2 is mounted to the outer skin 114 of the aircraft 100, as it is depicted in FIG. 2.

The light emission assembly connector 24 extends parallel to the axis A, i.e. parallel to the extension direction of the tower portion 16. The light emission assembly connector 24 is laterally offset from the tower portion 16, so that the light emission assembly connector 24 is not formed as a linear extension of the tower portion 16.

The light emission assembly connector 24 includes an electric connector 26, in particular a plug type electric connector 26 comprising a plurality of connecting pins 28, which are electrically connected to the light sources 18 by power lines 29, extending between the electric connector 26 and the connecting pins 28. The electric connector 26 allows for supplying electric power to the light sources 18 by connecting an electric power source (not shown) to the electric connector 26. Apart from the transfer of electric power, control information, such as on/or commands and/or synchronization commands for the emission of light flashes, may be provided via the electric connector 26. When the exterior aircraft light 2 is installed, the light emission assembly connector 24 may be connected to the electric aircraft on-board infrastructure, which may be referred to herein generally as the aircraft power supply and communication system.

Figure 6:
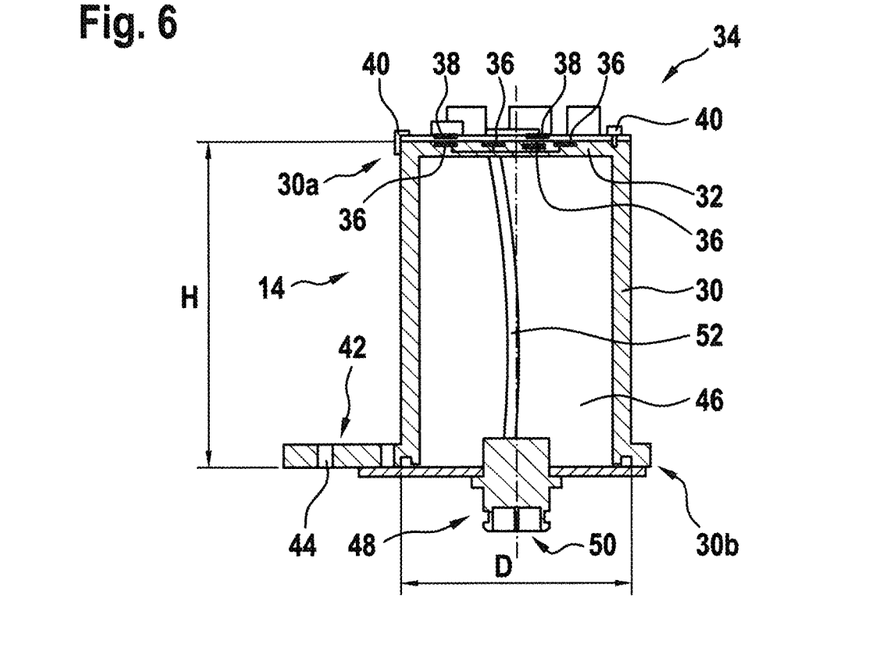
FIG. 6 depicts an enlarged cross-sectional side view of an interface assembly of the exterior aircraft light shown in FIGS. 2 and 3.
Figure 7:
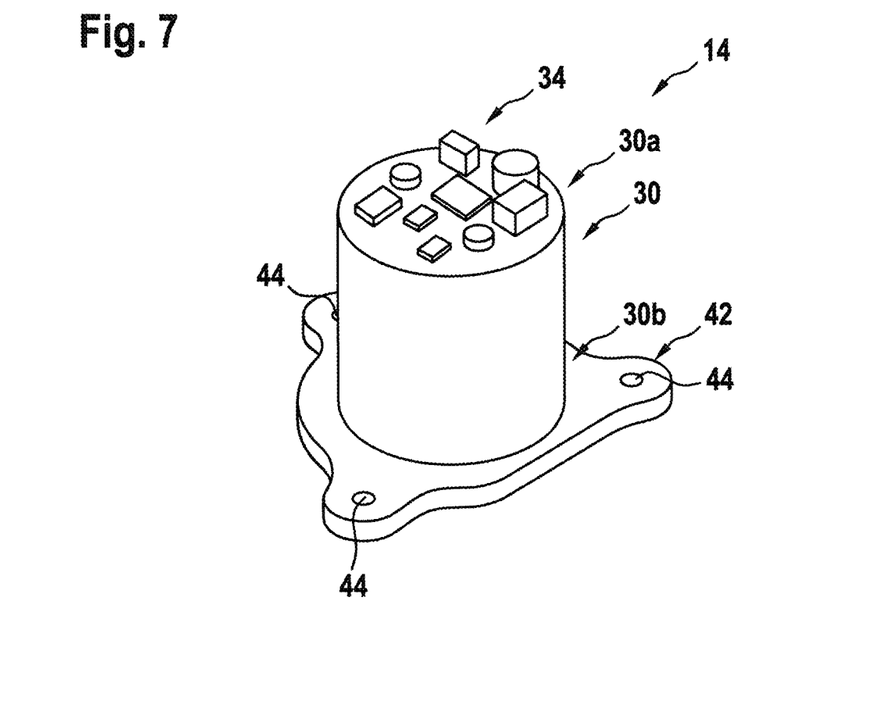
FIG. 7 depicts a perspective view of the interface assembly shown in FIG. 6.

FIG. 6 depicts an enlarged cross-sectional side view of the interface assembly 14, as it is employed in an exterior aircraft light 2 according to an exemplary embodiment of the invention, and FIG. 7 depicts a perspective view thereof.

The interface assembly 14 also comprises a tower portion 30, also referred to herein as interface assembly tower portion. In the assembled state of the exterior aircraft light 2, the tower portion 30 extends through the hollow channel 22, formed within the light emission assembly 12 (cf. FIG. 2).

The interface assembly tower portion 30 may have a cylindrical shape and may have a height H of 50 mm to 75 mm and a diameter D of 30 mm to 50 mm.

The interface assembly tower portion 30 may also have other shapes than the cylindrical shape, as it is depicted in FIGS. 6 and 7. For example, the interface assembly tower portion 30 may have a shape having an elliptical or polygonal cross-section. The interface assembly tower portion 30 may also have a tapered, in particular a conical, shape, i.e. a shape in which the diameter D of the tower portion 30 varies along the height of the tower portion 30.

At its first ("upper") end 30a facing the cover 4, the interface assembly tower portion 30 comprises an elevated base 32, which is configured for supporting and electrically connecting an electric component 34, in particular an electric component 34 selected from a data reception component, a data transmission component and a data generation component, or a combination thereof.

The electric component 34 may in particular include at least one of an antenna configured for sending and receiving electromagnetic waves for transmitting data from and/or to the aircraft 100, a sensor and a camera, which is configured for taking pictures of areas outside the aircraft 100. The sensor may include at least one of a light sensor, a radar sensor, a temperature sensor, a barometric pressure and a wind sensor. The sensor and/or the camera may be sensitive to visible light and/or to infrared light.

The elevated base 32 may be formed as a planar surface and may comprise at least one electric contact 36, which is configured for electrically connecting with a corresponding electric contact 38 provided at the electric component 34. The elevated base 32 may further include at least one mechanical fastener 40, which is configured for mechanically connecting and securing/fixing the electric component 34 to the elevated base 32. Such mechanical fasteners 40 may include, but are not limited to, bolts, screws, clamps and snap-on connectors.

At its second ("lower") end 30b facing the aircraft 100, the interface assembly tower portion 30 comprises a base portion 42, which is configured for mounting and fixing the interface assembly 14 to the aircraft 100.

The base portion 42 may comprise a plurality of openings 44, which may allow for fixing elements, such as bolts or screws (not shown), to fix the base portion 42 to the outer skin 114 of the aircraft 100.

A hollow channel 46 is formed within the interface assembly tower portion 30.

The interface assembly 14 further includes an interface assembly connector 48, protruding from the second ("lower") end 30b of the interface assembly tower portion 30.

The interface assembly connector 48 may in particular be a plug type electric connector 48, comprising at least one pin 50. The at least one pin 50 is electrically connected to the at least one electric contact 36, provided at the elevated base 32, by at least one signal line 52, in order to allow for transmitting data signals between the interface assembly connector 48 and the electric component 34, mounted to the elevated base 32. The at least one signal line 52 extends through the hollow channel 46, formed within the interface assembly tower portion 30 between the interface assembly connector 48 and the elevated base 32.

When the exterior aircraft light 2 is mounted to the aircraft 100, as depicted in FIG. 2, the interface assembly connector 48 extends through the outer skin 114 of the aircraft 100 into the interior 116 of the aircraft 100. The interface assembly connector 48 may be connected to the electric aircraft on-board infrastructure, i.e. to the aircraft power supply and communication system. The interface assembly 14 may receive power from the aircraft power supply and communication system and may exchange data with the aircraft power supply and communication system.

The interface assembly connector 48 is located at the center of the interface assembly tower portion 30, in particular on the common central axis A of the interface assembly tower portion 30 and the light emission assembly tower portion 16. Such a configuration may minimize the length of the at least one signal line 52, extending between the interface assembly connector 48 and the elevated base 32. A short length of the at least one signal line 52 is beneficial for reducing the risk of deteriorating data signals transmitted via the at least one signal line 52. Also, the arrangement of the interface assembly tower portion 30 and the light emission assembly tower portion in a telescopic manner on a common central axis A may allow for a particularly strong mechanical set-up, while providing manufacturing flexibility for introducing/removing the interface assembly 14 from the light emission assembly 12.

As depicted in FIG. 2, the elevated base 32 may be arranged in some distance d above, i.e. at a larger distance from the outer skin 114 of the aircraft 100 than, the upper end of the reflector 20 or any other element mounted to the platform portion 17 of the light emission assembly 12.

A configuration, in which the elevated base 32 is arranged above all elements mounted to the platform portion 17 of the light emission assembly 12, prevents the electric components 34, such as an antenna, a sensor and/or a camera, mounted to the elevated base 32, from being shielded by the reflector 20 or another element mounted to the platform portion 17.

The elevated base 32 may in particular be arranged in a distance d of 3 mm to 10 mm, in particular in a distance of 5 mm, above the upper end of any element mounted to the platform portion 17 of the light emission assembly 12.

Figure 8:
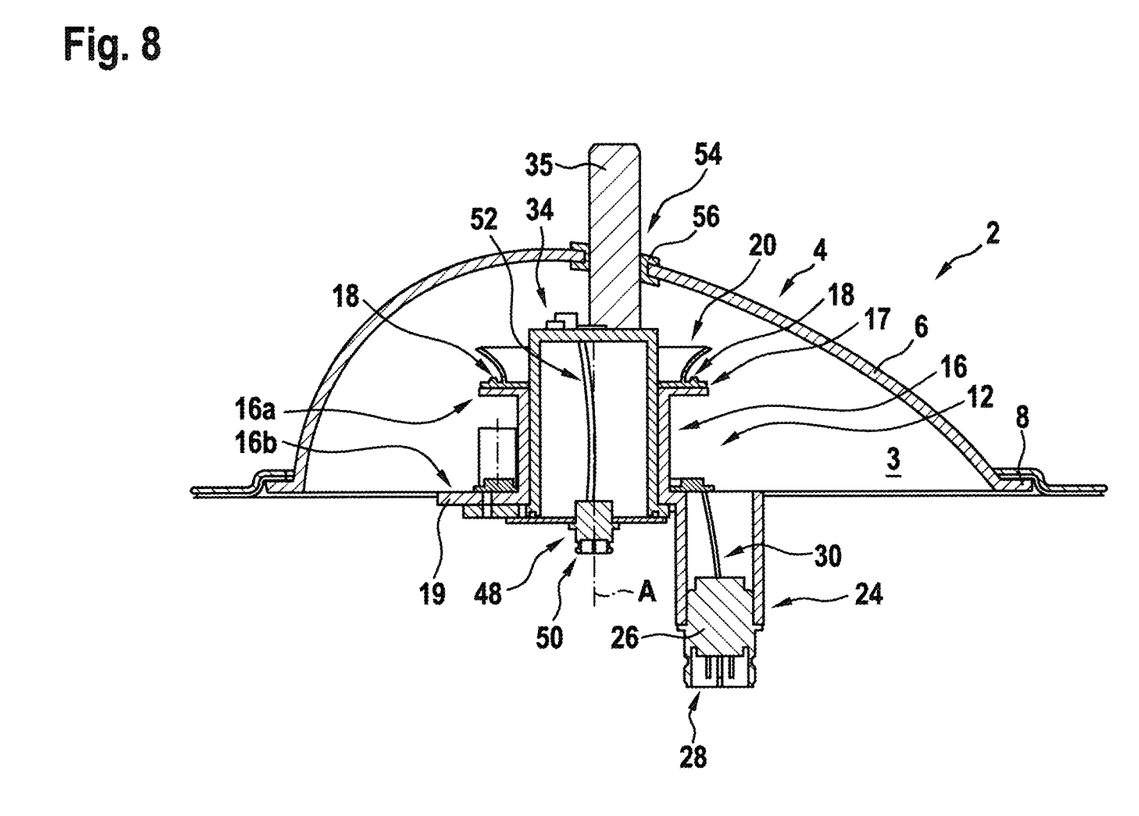
FIG. 8 depicts a cross-sectional side view through an exterior aircraft light according to another exemplary embodiment of the invention.
Figure 9:
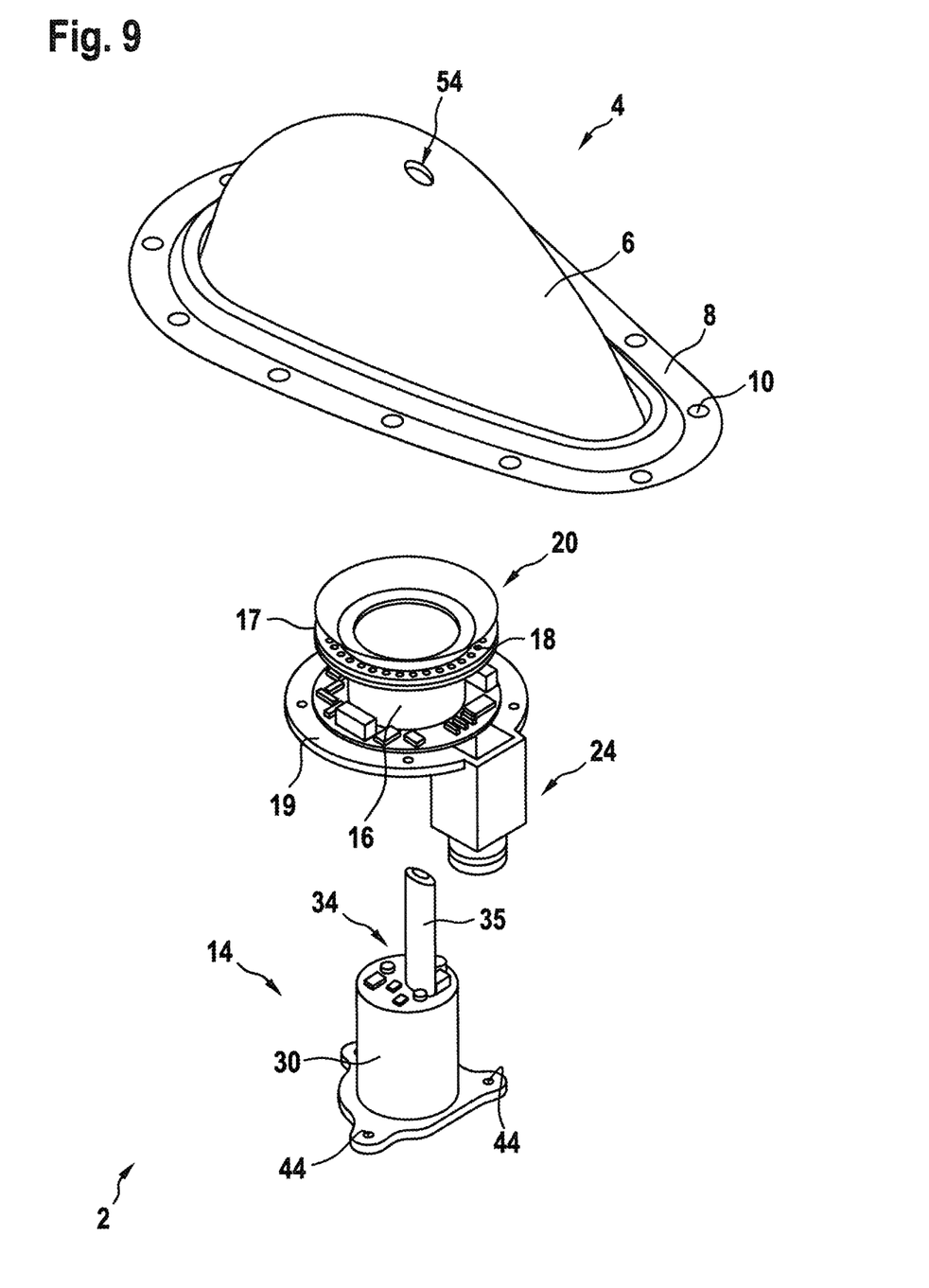
FIG. 9 depicts a perspective exploded view of the exterior aircraft light shown in FIG. 8.

FIG. 8 depicts a cross-sectional side view through an exterior aircraft light 2 according to another exemplary embodiment of the invention, and FIG. 9 depicts a perspective exploded view thereof.

Similar to the exterior aircraft light 2 depicted in FIGS. 2 to 7, the exterior aircraft light 2 depicted in FIGS. 8 and 9 comprises a dome-shaped light transmissive cover 4, including a convex portion 6 and defining an interior space 3, a light emission assembly 12, and an interface assembly 14, which are arranged within the interior space 3. The light emission assembly 12 and the interface assembly 14 are identical to the light emission assembly 12 and the interface assembly 14 depicted in FIGS. 2 to 7.

The embodiment of an exterior aircraft light 2 depicted in FIGS. 8 and 9 differs from the embodiment depicted in FIGS. 2 to 7 in that an opening 54 is formed within the dome-shaped light transmissive cover 4, in particular within the convex portion 6 thereof.

The opening 54 is formed at a position located above the elevated base 32 of the interface assembly 14, such that a portion 35 of an electric component 34, in particular a portion 35 of an antenna, supported by the elevated base 32 of the interface assembly 14, may extend through said opening 54 from the interior space 3 into the exterior environment of the exterior aircraft light 2.

Extending a portion 35 of the electric component 34 into the exterior environment of the exterior aircraft light 2 may enhance the functionality of the electric component 34. For example, extending a portion 35 of an antenna through the light transmissive portion 6 of the cover 4 may enhance the transmission and reception properties of the antenna. Also, the opening may allow for integrating an antenna with a greater extension than would fit into the space between the base 32 and the cover 4.

In the case of a sensor, extending a portion of the sensor out of the interior space 3 of the exterior aircraft light 2 may improve the quality of the detection signals provided by the sensor. For example, a temperature sensor or a wind sensor will provide better signals if it is at least partially located outside the interior space 3.

The exterior aircraft light 2 further comprises a gasket 56 (see FIG. 9). The gasket 56 is arranged between the inner rim of the opening 54 and the portion 35 of the electric component 34 extending through the opening 54. The gasket 56 is provided for sealing the interface between the cover 4 and the portion 35 of the electric component 34 extending through the opening 54. The gasket 56 may prevent water, moisture and/or dirt from penetrating into the interior space 3 of the exterior aircraft light 2.

As the embodiment of an exterior aircraft light 2 depicted in FIGS. 8 and 9 differs from the embodiment depicted in FIGS. 2 to 7 only by the convex portion 6 of the light transmissive cover 4, the same components, except for the cover 4, may be used for producing said two embodiments of the exterior aircraft light 2.

Depending on the intended use of the exterior aircraft light 2 and, in particular, depending on the electric component 34 to be installed within the exterior aircraft light 2, an appropriate cover 4 may be combined with the other components of the exterior aircraft light 2, which are common to both embodiments. This allows reducing the costs for producing the two different embodiments of the exterior aircraft light 2.

Further, the cover 4 may be changed even later, if another electric component 34 is to be mounted to the interface assembly 14. This allows for a very flexible use of the exterior aircraft light 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
   a dome-shaped light transmissive cover;
   a light emission assembly, comprising:
     a light emission tower portion, having a cover-facing end and an opposite aircraft-facing end and having a hollow channel, extending between the aircraft-facing end and the cover-facing end;
     a platform portion; and
     at least one light source and at least one optical element, arranged on the platform portion; and
   an interface assembly, which comprises an interface assembly tower portion extending through the hollow channel of the light emission tower portion, wherein the interface assembly tower portion comprises:
     an elevated base at a first end facing the dome-shaped light transmissive cover, wherein the elevated base is configured for mechanically supporting and electrically connecting an electric component, the electric component being at least one of a data reception component, a data transmission component, and a data generation component; and
     a base portion at a second end facing the aircraft, wherein the base portion is configured for mounting and fixing the interface assembly to the aircraft;
     wherein the interface assembly further comprises at least one signal line, extending from the elevated base through the interface assembly tower portion;
   wherein the light emission assembly and the interface assembly are covered by the dome-shaped light transmissive cover.

2. An exterior aircraft light according to claim 1, wherein the platform portion is located at or close to the cover-facing end of the light emission tower portion.

3. An exterior aircraft light according to claim 1, wherein the elevated base comprises a planar surface, which is configured for mechanically supporting the electric component.

4. An exterior aircraft light according to claim 1, wherein the elevated base comprises at least one electric contact, which is configured for electrically connecting with a corresponding electric contact provided at the electric component.

5. An exterior aircraft light according to claim 1, wherein the interface assembly comprises at least one mechanical fastener, which is configured for fixing the electric component to the interface assembly.

6. An exterior aircraft light according to claim 1, further comprising first and second connectors, protruding from an aircraft side of the exterior aircraft light and configured for electrically connecting the exterior aircraft light to an aircraft power supply and communication system, wherein the first connector is electrically coupled to the interface assembly in particular to the at least one signal line of the interface assembly, and wherein the second connector is electrically coupled to the light emission assembly.

7. An exterior aircraft light according to claim 6, wherein the first connector is arranged in a central portion of the light emission assembly and wherein the second connector is offset from the central portion of the light emission assembly.

8. An exterior aircraft light according to claim 1, wherein, when the exterior aircraft light is mounted to an aircraft, the dome-shaped light transmissive cover protrudes from an outer skin of the aircraft and defines an interior space of the exterior aircraft light between the outer skin of the aircraft and the dome-shaped light transmissive cover.

9. An exterior aircraft light according to claim 8, wherein, when the exterior aircraft light is mounted to the aircraft, the light emission assembly extends up to a first distance from the outer skin of the aircraft into the interior space; and
wherein the elevated base is located at a second distance, which is larger than the first distance, from the outer skin of the aircraft.

10. An exterior aircraft light according to claim 1, wherein at least one opening is formed in the dome-shaped light transmissive cover, the at least one opening allowing a portion of the electric component, supported by the elevated base, to extend through the dome-shaped light transmissive cover.

11. An exterior aircraft light according to claim 10, comprising a gasket, which is configured for sealing an interface between the dome-shaped light transmissive cover and the portion of the electric component extending through the opening.

12. An exterior aircraft light according to claim 1, wherein the exterior aircraft light is at least one of a position light, a red-flashing beacon light and a white strobe anti-collision light.

13. An exterior aircraft light according to claim 1, further comprising:
an electric component, arranged on and supported by the elevated base, wherein the electric component is at least one of a data reception component, a data transmission component, and a data generation component.

14. An exterior aircraft light according to claim 1, wherein the electric component is at least one of an antenna, a camera, and a sensor.

15. An aircraft comprising:
an exterior aircraft light according to claim 1,
wherein the exterior aircraft light is in particular mounted to a fuselage or to a wing of the aircraft.

16. The aircraft of claim 15, wherein the light is mounted to an upper side or a lower side of the fuselage.

17. The aircraft of claim 15, wherein the light is mounted to an upper side or a lower side of the wing of the aircraft.

18. An exterior aircraft light, comprising:
a dome-shaped light transmissive cover;
a light emission assembly, comprising:
a light emission tower portion, having a cover-facing end and an opposite aircraft-facing end and having a hollow channel, extending between the aircraft-facing end and the cover-facing end;
a platform portion; and
at least one light source and at least one optical element, arranged on the platform portion;
an interface assembly, extending through the hollow channel of the light emission tower portion, wherein the interface assembly comprises:
an elevated base, which is configured for mechanically supporting and electrically connecting an electric component, the electric component being at least one of a data reception component, a data transmission component, and a data generation component; and
at least one signal line, extending from the elevated base through the interface assembly; and
first and second connectors, protruding from an aircraft side of the exterior aircraft light and configured for electrically connecting the exterior aircraft light to an aircraft power supply and communication system, wherein the first connector is electrically coupled to the interface assembly in particular to the at least one signal line of the interface assembly, and wherein the second connector is electrically coupled to the light emission assembly;
wherein the first connector is arranged in a central portion of the light emission assembly and wherein the second connector is offset from the central portion of the light emission assembly.

19. An exterior aircraft light, comprising:
a dome-shaped light transmissive cover;
a light emission assembly, comprising:
a light emission tower portion, having a cover-facing end and an opposite aircraft-facing end and having a hollow channel, extending between the aircraft-facing end and the cover-facing end;
a platform portion; and
at least one light source and at least one optical element, arranged on the platform portion;
an interface assembly, extending through the hollow channel of the light emission tower portion, wherein the interface assembly comprises:
an elevated base, which is configured for mechanically supporting and electrically connecting an electric component, the electric component being at least one of a data reception component, a data transmission component, and a data generation component; and
at least one signal line, extending from the elevated base through the interface assembly,
wherein at least one opening is formed in the dome-shaped light transmissive cover, the at least one opening allowing a portion of the electric component, supported by the elevated base, to extend through the dome-shaped light transmissive cover; and
a gasket, which is configured for sealing an interface between the dome-shaped light transmissive cover and the portion of the electric component extending through the opening.

* * * * *